Nov. 29, 1960 — J. R. HANNOLD — 2,961,701
EXTRUSION APPARATUS
Filed Aug. 1, 1958
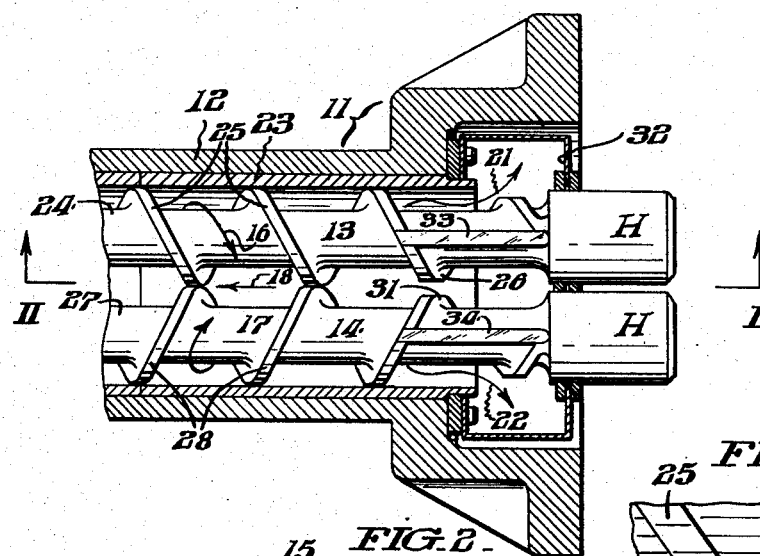
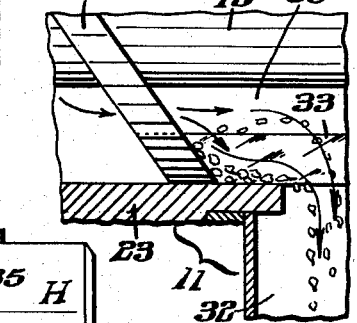
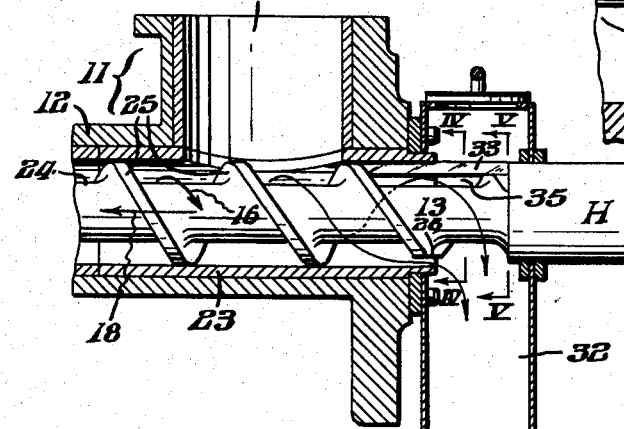
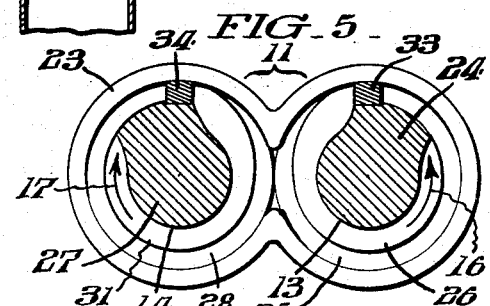
INVENTOR.
John R. Hannold,
BY Paul & Paul
ATTORNEYS.

United States Patent Office 2,961,701
Patented Nov. 29, 1960

2,961,701

EXTRUSION APPARATUS

John R. Hannold, Radnor, Pa., assignor to Welding Engineers, Inc., Norristown, Pa., a corporation of Delaware Filed Aug. 1, 1958, Ser. No. 752,453

4 Claims. (Cl. 18—12)

This invention relates to improvements in extrusion apparatus, and more particularly concerns apparatus for the extrusion of material, such as rubber, plastics, and the like, which contains a liquid, and to apparatus for removing the liquid from the material by squeezing and carrying it off, and to apparatus for preventing the accumulation of material within the extrusion apparatus.

Although this invention is not limited specifically to such processes, it is particularly applicable to the so-called "dry extrusion" processes wherein a mixture of liquid and yieldable or elastic solid is subjected to extreme pressure in a manner to remove substantially all the liquid, producing a solid product which is substantially completely dry.

Dry extrusion processes remove very substantial quantities of liquid from the solid mass, resulting in rapid liquid flow to the drain, which greatly aggravates the problems heretofore encountered in the art.

In accordance with the process of the extrusion of an elastic material such as rubber, a wet mix of the elastic material is fed to an extrusion apparatus, and the elastic material is forced forwardly toward the exit end of the extruder with a gradual increase of pressure, while the water is squeezed out by the compressing action of the extruder worm flights. The water is thus forced to travel in reverse, following a generally spiral path backwardly along the worm flights toward a drain.

In such procedure, the water tends to carry fine particles of the elastic material along with it. This material tends to build up along the inner surface of the extruder barrel forming an accumulation which eventually becomes sufficiently great to restrict the flow of water to the drain. As the material builds up on the inner surface of the extruder housing, the extrusion apparatus clogs and becomes inefficient or even totally useless.

Accordingly, it is an object of this invention to provide an apparatus which overcomes the foregoing disadvantages. More specifically, it is an object to provide an extrusion apparatus for accomplishing the unimpeded and rapid removal of a liquid from a solid elastic material.

It is another object of this invention to provide an extruder of the worm-and-housing type having a structure which prevents the accumulation of material within the extruder, and thus prevents clogging of the apparatus.

It is another object to provide an apparatus for "dry-extruding" material in a continuous manner, at a high rate and without clogging.

Other objects and advantages of this invention, including the simplicity and economy of the same, as well as the ease with which it may be adapted to existing equipment, will further become apparent hereinafter and in the drawings, in which:

Fig. 1 is a view in horizontal section of an extrusion apparatus constructed in accordance with this invention;

Fig. 2 is a view in vertical section of the extrusion apparatus shown in Fig. 1, and is taken as indicated by the lines and arrows II—II which appear in Fig. 1;

Fig. 3 is an enlarged partial view showing the apparatus of Fig. 2 at a different stage of rotation;

Fig. 4 is a view in cross section taken as indicated by the lines and arrows IV—IV which appear in Fig. 2; and Fig. 5 is a view in cross section taken as indicated by the lines and arrows V—V which appear in Fig. 2.

In describing the preferred embodiment of the invention illustrated in the drawings, specific terminology will be resorted to in the specification which follows, for the sake of clarity. However, the description in the specification is directed specifically to that form of the invention which is shown in the drawings, and is not intended to limit the scope of the invention, which is defined in the appended claims.

Turning now to the specific embodiment of the invention selected for illustration in the drawings, the extrusion apparatus includes a housing 11 which has an extruder barrel 12 in which is positioned a pair of screws or worms 13, 14 driven in rotation by a driving means acting through hubs H. Housing 11 also contains a feed opening 15 through which a slurry feed of, for example, rubber and water is introduced into extruder barrel 12. The worms 13 and 14 rotate in opposite directions, as indicated by the arrows 16, 17, to force the rubber toward the extruder end of barrel 12, as indicated by the arrow 18. Simultaneously, because of gradual decrease of space between the flights, the water is squeezed from the rubber and is forced toward the drain end of barrel 12, flowing as indicated by the arrows 21, 22 (Fig. 1). Barrel 12 is provided with a barrel liner 23, and the worms 13, 14 fit snugly in such liner.

Worm 13 includes a stem 24 and a helically disposed worm flight 25 which is constructed to form a close clearance with the inner surface of the corresponding barrel liner 23. Worm 13 is also provided with another worm flight 26, which is located in barrel 12 between the feed opening 15 and the drain end of barrel 12. Worm flight 26 is spaced apart from the inner surface of barrel liner 23 to form a drain for the water squeezed from the rubber (Fig. 2).

Worm 14 includes a stem 27 and a helically disposed worm flight 28 which is constructed to form a close clearance with the inner surface of barrel liner 23. The helix of worm flight 25 of worm 13 is opposite hand from the helix of the worm flight 28 of the worm 14. Flight 25 is shown in the drawings as being adjacent flight 28 as worms 13 and 14 are rotated in opposite directions. Instead of flights 25 and 28 being adjacent, they may be staggered. Worm 14 is also provided with a worm flight 31 which is located in barrel 12 between opening 15 and the drain end of barrel 12 and is spaced apart from the inner surface of barrel liner 23 to form a drain passage for the water squeezed from the rubber. Worm flights 26 and 31 do not contact the inner surface of barrel liner 23, and they do not contact each other (Fig. 1) as the worms 13 and 14 are rotated.

Positioned at the drain end of extruder barrel 12 is a drain conduit 32 which carries off the water squeezed from the rubber and received from extruder barrel 12.

To prevent accumulation of rubber on the inner surface of barrel liner 23, there are provided scraper bars 33 and 34. Scraper bar 33 extends along a line parallel to the longitudinal axis of stem 24 and is spaced away from the stem. The outer surface of spacer bar 33 conforms to the inner surface of barrel 23, and it scrapes and scours any solids which accumulate on the inner surface of barrel liner 23.

The inner surface of scraper bar 33 is spaced a predetermined distance from stem 24 to form an opening 35 between scraper bar 33 and stem 24. Opening 35 acts as a flushing nozzle through which the water is passed. As the water flows through opening 35, it becomes turbulent and serves to flush and remove any rubber that may tend to deposit on the scraper bar, and serves to carry the rubber to drain conduit 32. This action is shown in Fig. 3.

In operation, a slurry is fed to the extrusion apparatus through feed opening 15. For purposes of illustration, this slurry may be a synthetic rubber with a water carrier. The extruder worms 13 and 14 rotate to compress, knead, and de-water the slurry. As this is being done, the water is being removed and forced toward the drain end of barrel 12 to be carried away in drain conduit 32. To prevent accumulation of particles of rubber on the inner surface of barrel liner 23, scraper bars 33 and 34 rotate with worms 13 and 14 and coact with the flushing action of the water removed to keep the inner surface free of any such deposit and to prevent any clogging of the extrusion apparatus. Scraper bars 33, 34 scour the inner surface over its entire area. The openings 35 coact with the scraper bars to prevent these particles from accumulating on the scraper bars and their associated stems 24, 27. As the scraper bars rotate counter-current to the flow of liquid through the openings 35, the openings 35 form flushing nozzles which flush the particles into drain conduit 32. This counter-current flow arrangement is important and advantageous.

Although I have shown and described a dual screw worm, it is to be understood that the invention is applicable to an extruder having one or more worms.

Moreover, the scraper bar need not be parallel to the axis of the worm. The scraper bar may be at an angle, such as normal to the lead angles of the worm flights, or any other angle. With the scraper bar positioned at an angle, one of its ends forms a trailing edge which aids in the removal of the material to drain. The amount of turbulence required for keeping material from accumulating on the elements of the apparatus is influenced by the adhesiveness of the material, its quantity, and so forth.

It is to be understood that the form of the invention herein shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described my invention, I claim:

1. Extrusion apparatus for material containing a liquid comprising a housing, a worm snugly fitted within the housing and having a stem and a generally spirally arranged worm flight, said housing having a feed opening, power means for rotating said worm to move material forwardly along within said housing, a drain outlet connected to said housing rearwardly of said feed opening for the elimination of liquid squeezed from said material, the end of said worm flight that is located rearwardly of said feed opening being spaced away from the inner surface of said barrel to form a passage for drainage for the liquid, scraper means carried by said worm flight rearwardly of said feed opening, and means providing a liquid passage between said scraper means and said worm stem, said scraper means being arranged in close running clearance with said housing.

2. Extrusion apparatus for material containing a liquid comprising a housing including an extruder barrel having an inner surface, an extruder end, and a drain, a worm snugly fitted within the barrel and having a stem and a worm flight, said housing having a feed opening located forwardly of said drain but rearwardly of said extruder end, a scraper bar spaced away from the stem of said worm extending generally along the longitudinal axis of the stem, said scraper bar being located rearwardly of said feed opening and having an outer surface conforming in shape to the inner surface of said barrel, means providing a liquid flow passage intermediate the outer surface of the scraper bar and the stem of the worm, said passage extending from one side of said scraper bar to the other to form a flushing nozzle means with said stem to cause said liquid to become turbulent and to remove any accumulation of material from the scraper bar and carry it to said drain.

3. Extrusion apparatus for material containing a liquid comprising a housing having an inner surface, a pair of worms snugly fitted within the housing, each worm having a stem and a helically disposed worm flight so constructed to forward material with the peripheries of the worm flights tangent to each other, said housing having a feed opening and a drain outlet located rearwardly of said feed opening, each of said worms having a worm flight located rearwardly of said feed opening and above said drain outlet which is spaced away from the inner surface of said housing to form a drain passage for the liquid squeezed from said material, and scraper bar means connected to said flight rearwardly of said feed opening, arranged in close running contact with said housing, and spaced from said stem forming an intervening flushing nozzle-opening coacting with the flow of the liquid squeezed from the feed to prevent accumulation of solids on said worms or housing.

4. Extrusion apparatus for material containing a liquid comprising a housing including an extruder barrel having an inner surface, an extruder end, and a drain end, a pair of worms snugly fitted within the barrel, each worm having a stem and a helically disposed worm flight, the helix of one flight being opposite hand to the helix of the other so that the flight of one worm has its periphery tangent the periphery of the flight of the other worm as the worms are rotated in opposite directions; said housing having a feed opening positioned intermediate the ends of said barrel, a drain outlet positioned rearwardly of said feed opening at the drain end of the barrel, each worm having a worm flight of reduced size located in said barrel between said feed opening and said drain outlet, which flight is spaced away from the inner surface of said barrel to form a passage for drainage of the liquid squeezed from said material, each said worm of reduced size having fixed thereon a scraper bar which is located in said barrel between said feed opening and said drain outlet, said scraper bar being spaced away from the stem of its worm, extending along the longitudinal axis of the stem, and having its outer surface conforming to the inner surface of said barrel, each of said scraper bars having its inner surface spaced a predetermined distance from its associated stem to form flushing nozzle means with its associated stem to cause said liquid to become turbulent and to remove any accumulation of material from the scraper bar and carry such material to said drain outlet.

References Cited in the file of this patent

UNITED STATES PATENTS

| | | |
|---|---|---|
| 2,441,222 | Fuller | May 11, 1948 |
| 2,535,462 | Stoelting et al. | Dec. 26, 1950 |
| 2,615,199 | Fuller | Oct. 28, 1952 |